United States Patent
Lee et al.

(10) Patent No.: US 9,637,021 B2
(45) Date of Patent: May 2, 2017

(54) EMERGENCY START DEVICE OF FUEL CELL VEHICLE FOR DC/DC CONVERTER FAILURE

(71) Applicant: Hyundai Motor Company, Seoul (KR)

(72) Inventors: Kyuil Lee, Gyeonggi-do (KR); Kyung Won Suh, Seoul (KR); Sung Gone Yoon, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 733 days.

(21) Appl. No.: 14/097,919

(22) Filed: Dec. 5, 2013

(65) Prior Publication Data

US 2014/0183940 A1 Jul. 3, 2014

(30) Foreign Application Priority Data

Dec. 31, 2012 (KR) .................. 10-2012-0158611

(51) Int. Cl.
| | |
|---|---|
| *B60L 11/18* | (2006.01) |
| *B60R 16/03* | (2006.01) |
| *H01M 8/04* | (2016.01) |
| *H01M 8/04955* | (2016.01) |
| *B60L 3/00* | (2006.01) |

(52) U.S. Cl.
CPC ............. *B60L 11/1885* (2013.01); *B60L 3/00* (2013.01); *B60L 3/0053* (2013.01); *B60L 3/0092* (2013.01); *B60R 16/03* (2013.01); *H01M 8/04955* (2013.01); *H01M 2250/20* (2013.01); *Y02T 90/32* (2013.01); *Y02T 90/34* (2013.01)

(58) Field of Classification Search
CPC .. B60L 11/1885; B60L 3/0092; B60L 3/0053; B60L 3/00; B60R 16/03; H01M 8/04955; H01M 2250/20; Y02E 60/50; Y02T 90/32; Y02T 90/34
USPC ..................................... 307/9.1, 66
See application file for complete search history.

(56) References Cited

U.S. PATENT DOCUMENTS

| | | | |
|---|---|---|---|
| 6,255,008 B1* | 7/2001 | Iwase | B60L 11/1881 180/65.275 |
| 7,543,454 B2* | 6/2009 | Harris | B60H 1/00535 417/362 |
| 8,283,082 B2* | 10/2012 | Ojima | H01M 8/04089 429/400 |

(Continued)

FOREIGN PATENT DOCUMENTS

| | | |
|---|---|---|
| JP | 2007-228728 A | 9/2007 |
| JP | 2009-224036 A | 10/2009 |

(Continued)

*Primary Examiner* — Jared Fureman
*Assistant Examiner* — Michael Warmflash
(74) *Attorney, Agent, or Firm* — Mintz Levin Cohn Ferris Glovsky and Popeo, P.C.; Peter F. Corless

(57) ABSTRACT

An emergency start device of a fuel cell vehicle having a motor as a driving source is provided and includes a fuel cell that supplies power to a motor and an air blower that supplies air to the fuel cell. A high voltage battery supplies power to the air blower and a direct current (DC) converter increases an output of the high voltage battery to transfer the output to the air blower. In addition, a first switch transfers or intercepts an output of the high voltage battery to the air blower. By directly transferring a voltage of the high voltage battery to the air blower, the fuel cell is driven, when the DC converter fails while driving by the high voltage battery.

16 Claims, 4 Drawing Sheets

(56) References Cited

U.S. PATENT DOCUMENTS

| | | | | |
|---|---|---|---|---|
| 8,508,066 B2 * | 8/2013 | Lee | ...................... | B60L 11/1803 307/10.1 |
| 2011/0095603 A1 * | 4/2011 | Lee | ...................... | B60L 11/1803 307/10.1 |
| 2012/0053766 A1 * | 3/2012 | Ham | ...................... | B60L 3/0053 701/22 |
| 2014/0028087 A1 * | 1/2014 | Lee | ......................... | B60R 16/02 307/9.1 |

FOREIGN PATENT DOCUMENTS

| KR | 10-2008-0086941 A | 9/2008 |
|---|---|---|
| KR | 10-2009-0042356 A | 4/2009 |
| KR | 10-2009-0062332 A | 6/2009 |
| KR | 10-2012-0020686 A | 3/2012 |

\* cited by examiner

EMERGENCY START DEVICE OF FUEL CELL VEHICLE FOR DC/DC CONVERTER FAILURE

CROSS-REFERENCE TO RELATED APPLICATION

This application claims priority to and the benefit of Korean Patent Application No. 10-2012-0158611 filed in the Korean Intellectual Property Office on Dec. 31, 2012, the entire contents of which are incorporated herein by reference.

BACKGROUND (a) Field of the Invention

The present invention relates to a fuel cell vehicle. More particularly, the present invention relates to an emergency start device of a fuel cell vehicle emergency starts when a direct current-direct current (DC/DC) converter fails in the fuel cell vehicle that has a high voltage battery.

(b) Description of the Related Art

A fuel cell system that is applied to a hydrogen fuel cell vehicle, which is one of environment-friendly future vehicles includes a fuel cell stack that generates electrical energy with an electrochemical reaction of a reaction gas, a hydrogen supply device that supplies hydrogen, which is fuel to the fuel cell stack, an air supply device that supplies air including oxygen, which is an oxidizing agent necessary for an electrochemical reaction to the fuel cell stack, a heat and water management system that controls an operation temperature of the fuel cell stack by discharging heat, which is a by-product of an electrochemical reaction of the fuel cell stack to the exterior and that performs a water management function, and a fuel cell system controller that operates the fuel cell system.

In a vehicle in which such a fuel cell system is mounted, when using only a fuel cell as a power source, the fuel cell provides a charge of the loads of constituent elements constituting the vehicle and thus in an operating area in which efficiency of the fuel cell decreases, performance may deteriorate. Further, when a sudden load is applied to the vehicle, power may not be fully supplied to a driving motor and thus a performance of the vehicle may deteriorate due to electricity generated by a chemical reaction. In addition, since the fuel cell has one direction output characteristics, when no separate power storage means exists, when the vehicle brakes, energy injected from a driving motor may not be recovered and thus efficiency of a vehicle system may deteriorate.

Therefore, as a method of supplementing the drawbacks, a fuel cell hybrid vehicle has been developed. The fuel cell hybrid vehicle is a system that mounts a power storage means, for example, a super capacitor (e.g., super cap) or a high voltage battery that can be charged and discharged as a separate auxiliary power source for providing power necessary for driving a load, such as a driving motor in addition to a fuel cell, which is a major power source in a larger vehicle such as a bus as well as a smaller vehicle such as a sedan.

In a fuel cell-battery hybrid vehicle, a fuel cell that is used as a major power source and a high voltage battery that is used as an auxiliary power source are coupled in parallel, and such a high voltage battery (e.g., main battery) and a low voltage battery (e.g., 12V auxiliary battery) for driving low voltage driving parts of the vehicle are mounted, i.e., a high voltage battery and a low voltage battery, which are two kinds of batteries are mounted together.

When starting a fuel cell, hydrogen and air should be supplied to the fuel cell, and until the fuel cell reaches a normal operating state, since high voltage driving parts (e.g., an air blower) may not be driven with an output of the fuel cell, in a state that supplies hydrogen from a hydrogen tank to the fuel cell by opening a hydrogen supply valve (e.g., starting/stop), by driving an air supply device, (e.g., an air blower with power of a high voltage battery) air including oxygen that is used as an oxidizing agent should be supplied to the fuel cell. The above information disclosed in this section is only for enhancement of understanding of the background of the invention and therefore it may contain information that does not form the prior art that is already known in this country to a person of ordinary skill in the art.

SUMMARY

The present invention provides an emergency start device of a fuel cell vehicle that continues to travel without stopping a vehicle even when a DC/DC converter fails when a fuel cell is stopped while starting or traveling a fuel cell vehicle that uses the DC/DC converter between the fuel cell and a battery.

An exemplary embodiment of the present invention provides an emergency start device of a fuel cell vehicle having a motor as a driving source including: a fuel cell that supplies power to a motor; an air blower that supplies air to the fuel cell; a high voltage battery that supplies power to the air blower; a DC converter that increases an output of the high voltage battery to transfer the output to the air blower; and a first switch that transfers or intercepts an output of the high voltage battery to the air blower, wherein by directly transferring a voltage of the high voltage battery to the air blower, the fuel cell may be driven, when the DC converter fails while driven by the high voltage battery.

The DC converter may include a first transistor and a second transistor connected in series between the first node and the ground; and a charge capacitor that is formed between the first node and the ground. The first switch may be turned on to transfer an output of the high voltage battery to a second node between the first transistor and the second transistor. The emergency start device may further include a controller configured to turn the first switch and the first and second transistors on and off. The controller may be configured to periodically sense a failure of the DC converter in an electric vehicle (EV) mode that is driven by the high voltage battery. In addition, the controller may be configured to convert the EV mode to an emergency start mode by turning on the first switch and the first transistor, when the DC converter fails in the EV mode.

The air blower may be turned on by a voltage of the high voltage battery in the emergency start mode. The DC converter may provide a voltage to the charge capacitor by alternately turning on the first transistor and the second transistor. The DC converter may further include a filter that filters an output of the high voltage battery. The fuel cell may further include a diode that prevents backward flow.

According to an exemplary embodiment of the present invention, while starting or stopping a fuel cell, when a DC/DC converter fails, startability and restartability upon stopping the fuel cell may be improved using a voltage of a high voltage battery with an emergency logic.

In a system having an existing power net, when a DC/DC converter fails, starting is unavailable, and while traveling, when the fuel cell is stopped, when a voltage of the fuel cell is about 0V, restarting is unavailable, but according to an exemplary embodiment of the present invention, by entering a fuel cell mode, driving of a vehicle is available and thus stability for a failure of a fuel cell vehicle may be improved.

DETAILED DESCRIPTION

Figure 1:
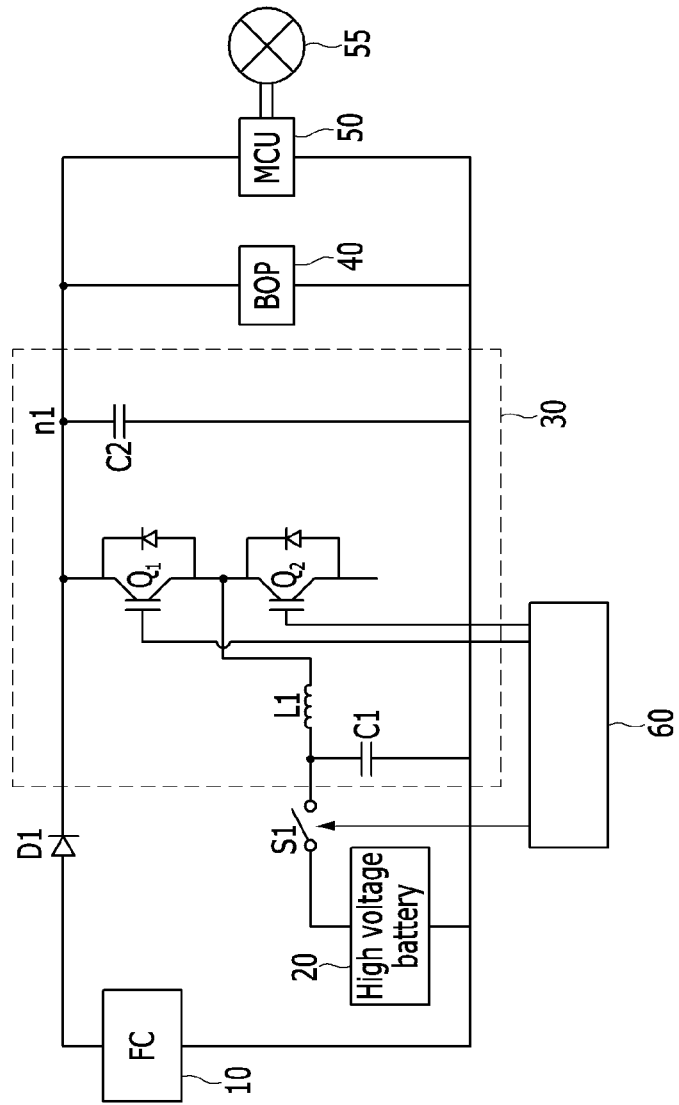
FIG. 1 is an exemplary diagram illustrating an emergency start device of a fuel cell vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles, and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the following detailed description, exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 is an exemplary diagram illustrating an emergency start device of a fuel cell vehicle according to an exemplary embodiment of the present invention. As shown in FIG. 1, an emergency start device of a fuel cell vehicle may include a fuel cell 10, a high voltage battery 20, a DC/DC converter 30 configured to convert an output of the high voltage battery 20, a first switch S1 configured to switch an output of the high voltage battery 20, an air blower 40 configured to supply air to the fuel cell 10, a motor controller 50 configured to receive an output of the fuel cell 10 to operate a motor 55, the motor 55 that is driven by the control of the motor controller 50 (a first controller), and a vehicle controller 60 (e.g., a second controller).

Specifically, the fuel cell 10 may be connected to a first node n1 via a first diode D1 to supply a voltage to the motor controller 50. The air blower 40 may be configured to supply air together with hydrogen, which is a reaction gas to the fuel cell 10 upon starting the fuel cell 10. The air blower 40 may be connected to the first node n1 to receive a voltage and to be driven.

The high voltage battery 20 may not drive high voltage driving parts such as the air blower 40 with an output of the fuel cell 10 until the fuel cell 10 reaches a normal operation state (e.g., when failure has not occurred). Therefore, when hydrogen, which is fuel from a hydrogen tank to the fuel cell 10 is supplied by opening a hydrogen supply valve (starting/stop), by driving the air blower 40 using power of the high voltage battery 20, the high voltage battery 20 may supply air including oxygen that is used as an oxidizing agent to the fuel cell 10. Such a high voltage battery 20 may be connected to the DC/DC converter 30 via the first switch S1. The DC/DC converter 30 may be a bidirectional high voltage DC/DC converter (BHDC) and may have the same configuration as that of FIG. 1. In other words, a first inductor L1 and a first capacitor C1 connected by the high voltage battery 20 and the first switch S1 may form an LC filter and may include first and second transistors Q1 and Q2 connected to the first inductor L1 and a second node n2.

The first and second transistors Q1 and Q2 may be connected in series between the first node n1 and the ground, and a terminal between the first and second transistors Q1 and Q2 may be the second node n2. A second capacitor C2 may be formed in the first node n1 in parallel to the first and second transistors Q1 and Q2, and for a predetermined period of time, as the first and second transistors Q1 and Q2 are alternately turned on, a charge may be applied at the second capacitor C2 and thus a converted high voltage may be generated to be provided to the air blower 40. In such an emergency start device, the high voltage battery 20 may not be directly connected to the DC/DC converter 30, a connection may be performed in an emergency mode by the first switch S1 that switches connection of the high voltage battery 20. The controller 60 of FIG. 1 may be configured to turn the first switch S1 and the first and second transistors Q1 and Q2 of the DC/DC converter 30 on and off to operate according to a stored emergency start mode logic.

Figure 2:
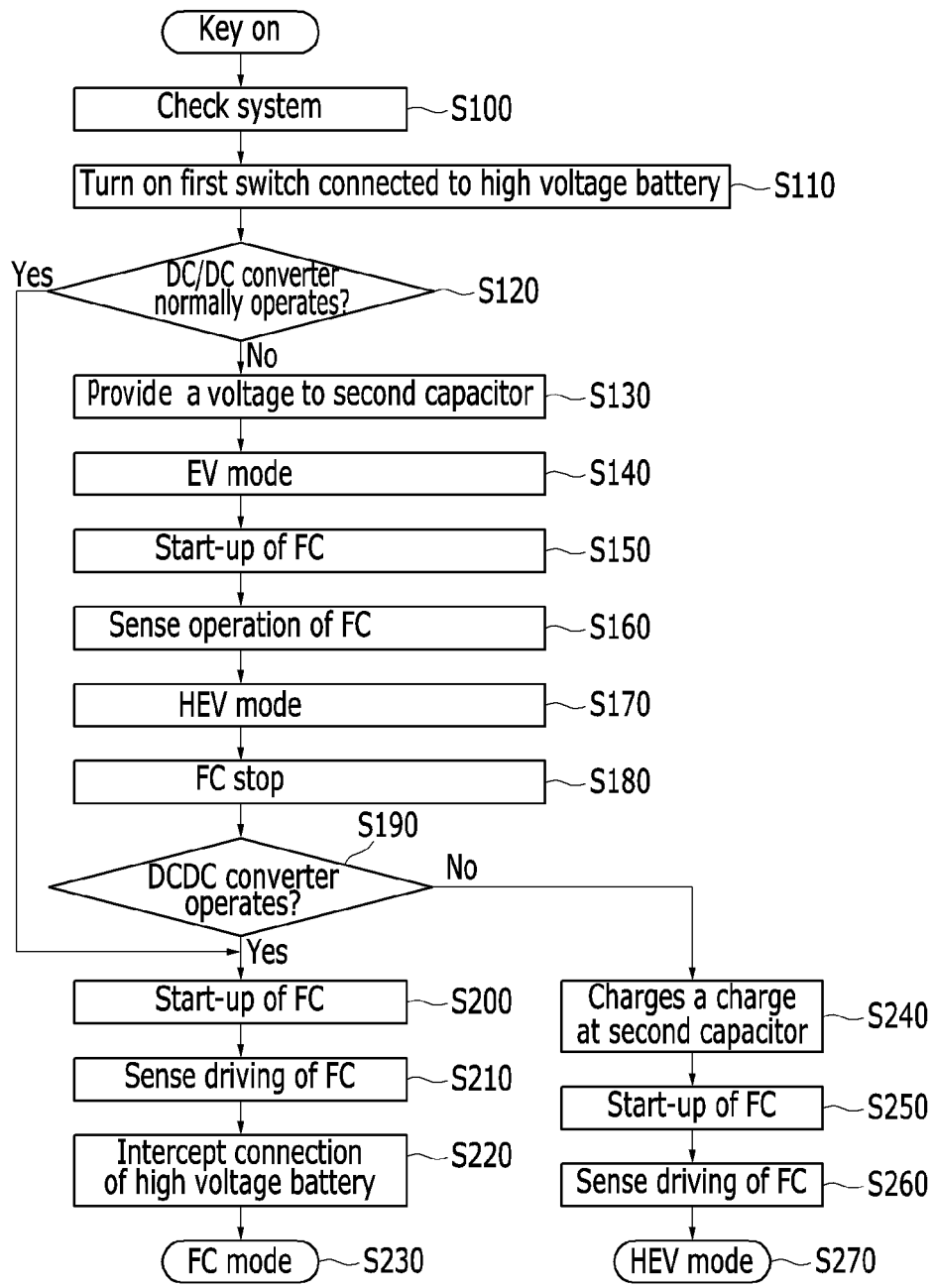
FIG. 2 is an exemplary flowchart illustrating operation of an emergency start device of a fuel cell vehicle according to an exemplary embodiment of the present invention.
Figure 3:
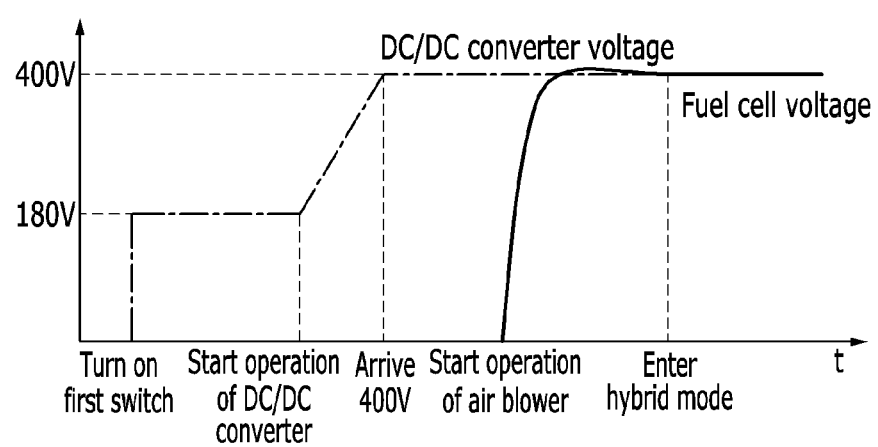
FIG. 3 is an exemplary graph illustrating a voltage of each constituent element at normal starting according to an exemplary embodiment of the present invention.
Figure 4:
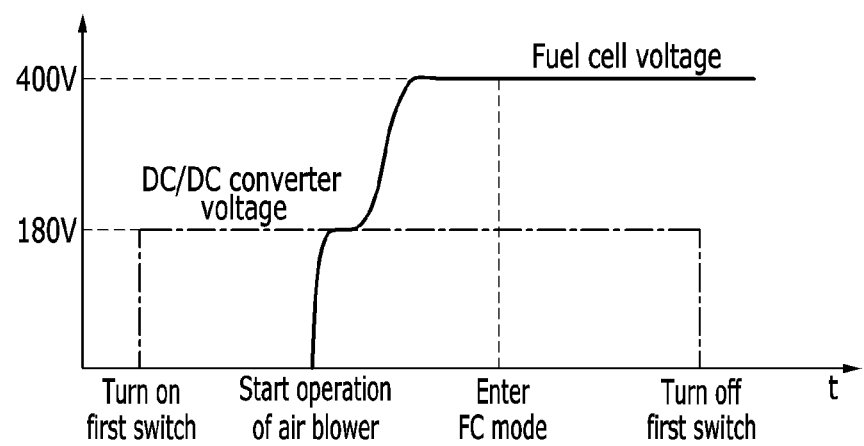
FIG. 4 is an exemplary graph illustrating a voltage of each constituent element in an emergency start state when a DC/DC converter fails according to an exemplary embodiment of the present invention.

Hereinafter, a logic of an emergency start mode of the present invention will be described with reference to FIGS. 2 to 4. FIG. 2 is an exemplary flowchart illustrating operation of an emergency start device of a fuel cell vehicle according to an exemplary embodiment of the present invention, FIG. 3 is an exemplary graph illustrating a voltage of each constituent element at normal starting, and FIG. 4 is an exemplary graph illustrating a voltage of each constituent element in an emergency start state when the DC/DC converter 30 fails.

First, a general starting mode is described. As shown in FIG. 2, when a vehicle key is turned, a starting mode of the vehicle may start. The vehicle controller 60 may be configured to determine whether a system operates normally (e.g., operates without failure) (S100) and may be configured to turn on the first switch S1 connected to the high voltage battery 20 (S110). When the first switch S1 is turned on, a battery voltage in which noise is removed by a filter may be transferred to the second node n2.

Furthermore, the vehicle controller 60 may be configured to determine whether the DC/DC converter 30 operates normally (S120). When the DC/DC converter 30 operates normally, the vehicle controller 60 may be configured to alternately turn on and off the first and second transistors Q1 and Q2 and provide a voltage to the second capacitor C2 (S130), as shown in FIG. 3. Therefore, when a voltage of the second capacitor C2 is charged to about 400V, the vehicle may be in an EV mode (S140) and the air blower 40 may be turned on by the high voltage battery 20 and operation may begin.

As the air blower 40 starts, when air is supplied to the fuel cell 10, the fuel cell 10 may perform start-up (S150). When the vehicle controller 60 senses operation of the fuel cell 10 (S160), a mode of the vehicle may be converted to a hybrid mode (HEV) (S170). In other words, upon starting, until the fuel cell 10 operates, the vehicle operates by the high voltage battery 20, and when the fuel cell 10 starts operation by start-up, the vehicle may operate in a hybrid mode in which both the high voltage battery 20 and the fuel cell 10 operate.

In a hybrid mode, when operation of the fuel cell 10 is stopped and the vehicle travels by the high voltage battery 20 (S180), the vehicle controller 60 may be configured to periodically determine whether the DC/DC converter 30 operates normally (S190). In particular, when the DC/DC converter 30 does not operate normally, a mode of the vehicle controller 60 may be converted to an emergency start mode. In other words, the vehicle controller 60 may be configured to turn on the first switch S1 of the high voltage battery 20, turn on the first transistor Q1, and transfer a voltage of the high voltage battery 20 to the first node n1. In addition, the air blower 40 may be turned on with a voltage of the high voltage battery 20 to start operation.

As the air blower 40 starts operation, when air is supplied to the fuel cell 10, the fuel cell 10 may perform start-up (S200). When the vehicle controller 60 senses operation of the fuel cell 10 (S210), by turning off the first switch S1, the vehicle controller 60 may be configured to intercept connection of the high voltage battery 20 (S220) and convert a mode of the vehicle to an fuel cell (FC) mode that supplies power to the motor by operating the fuel cell 10 (S230).

In an EV mode in which the fuel cell 10 is turned off, when the DC/DC converter 30 fails, by starting again the fuel cell 10 with only a voltage of the high voltage battery 20, a mode of the vehicle may be converted to an FC mode and thus even when the DC/DC converter 30 fails, the vehicle may continue traveling without turning off starting. In particular, when the DC/DC converter 30 operates normally, the vehicle controller 60 may be configured to provide a voltage at the second capacitor C2 by alternately turning on and off the first and second transistors Q1 and Q2 (S240). Therefore, when a voltage of the second capacitor C2 is charged to about 400V, in an EV mode, the air blower 40 may be turned on by the high voltage battery 20 and starts operation.

As the air blower 40 starts operation, when air is supplied to the fuel cell 10, the fuel cell 10 may perform start-up (S250). When the vehicle controller 60 senses operation of the fuel cell 10 (S260), a mode of the vehicle may be converted to a hybrid mode (S270). In other words, upon starting, until the fuel cell 10 operates, the vehicle may operate by the high voltage battery 20, and when the fuel cell 10 starts operation by start-up, the vehicle may operate in a hybrid mode in which both the high voltage battery 20 and the fuel cell 10 drive.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the accompanying claims.

| Description of symbols | |
|---|---|
| fuel cell 10 | high voltage battery 20 |
| DC/DC converter 30 | air blower 40 |
| motor controller 50 | motor 55 |
| controller 60 | |

What is claimed is:
1. An emergency start device of a fuel cell vehicle having a motor as a driving source, the emergency start device comprising:
 a fuel cell configured to supply power to the motor;
 an air blower configured to supply air to the fuel cell;
 a high voltage battery configured to supply power to the air blower;
 a direct current (DC) converter configured to increase an output of the high voltage battery to transfer the output to the air blower; and
 a first switch configured to transfer or intercept an output of the high voltage battery to the air blower,
 wherein by directly transferring a voltage of the high voltage battery to the air blower, the fuel cell is driven, when the DC converter fails while driven by the high voltage battery,
 wherein a controller is configured to turn on the first switch and sense a failure of the DC converter,
 wherein when the fuel cell is stopped and the vehicle is driven by the high voltage battery, the controller is configured to periodically sense the failure of the DC converter in an electric vehicle (EV) mode, and wherein when air is supplied to start the fuel cell, the controller is configured to turn off the first switch to intercept the output of the high voltage battery.

2. The emergency start device of claim 1, wherein the DC converter comprises
a first transistor and a second transistor connected in series between the first node and the ground; and
a charge capacitor formed between a first node and ground.

3. The emergency start device of claim 2, wherein the first switch is turned on to transfer an output of the high voltage battery to a second node between the first transistor and the second transistor.

4. The emergency start device of claim 3, wherein the controller is configured to turn the first and second transistors on and off.

5. The emergency start device of claim 4, wherein the controller is further configured to convert the EV mode to an emergency start mode by turning on the first switch and the first transistor, when the DC converter fails in the EV mode.

6. The emergency start device of claim 5, wherein the air blower is turned on by a voltage of the high voltage battery in the emergency start mode.

7. An emergency start method of a fuel cell vehicle having a motor as a driving source, the method comprising:
determining, by a controller, whether a direct-current (DC) converter operates normally;
in response to determining that the DC/DC converter is operating normally, alternately turning on and off, by the controller, first and second transistors and charging a charge to a second capacitor;
turning on, by the controller, an air blower using a voltage battery when a voltage of the second capacitor has reached a predetermined voltage;
periodically sensing, by the controller, a failure of the DC converter in an electric vehicle (EV) mode that is driven by the high voltage battery; and
turning off, by the controller, voltage supply to the air blower when the fuel cell is started.

8. The method of claim 7, wherein the predetermined voltage is about 400V.

9. The method of claim 7, wherein the DC converter comprises
a first transistor and a second transistor connected in series between the first node and the ground; and
a charge capacitor formed between a first node and ground.

10. The method of claim 9, wherein the first switch is turned on to transfer an output of the high voltage battery to a second node between the first transistor and the second transistor.

11. The method of claim 10, further comprising:
converting, by the controller, the EV mode to an emergency start mode by turning on the first switch and the first transistor, when the DC converter fails in the EV mode.

12. A non-transitory computer readable medium containing program instructions executed by a controller, the computer readable medium comprising:
program instructions that determine whether a direct-current (DC) converter operates normally;
program instructions that alternately turn on and off first and second transistors and charging a charge to a second capacitor in response to determining that the DC/DC converter is operating normally;
program instructions that turn on an air blower using a voltage battery when a voltage of the second capacitor has reached a predetermined voltage;
program instructions that periodically sense a failure of the DC converter in an electric vehicle (EV) mode that is driven by the high voltage battery; and
program instructions that turn off voltage supply to the air blower when the fuel cell is started.

13. The non-transitory computer readable medium of claim 12, wherein the predetermined voltage is about 400V.

14. The non-transitory computer readable medium of claim 12, wherein the DC converter comprises
a first transistor and a second transistor connected in series between the first node and the ground; and
a charge capacitor formed between a first node and ground.

15. The non-transitory computer readable medium of claim 14, wherein the first switch is turned on to transfer an output of the high voltage battery to a second node between the first transistor and the second transistor.

16. The non-transitory computer readable medium of claim 15, further comprising:
program instructions that convert the EV mode to an emergency start mode by turning on the first switch and the first transistor, when the DC converter fails in the EV mode.

* * * * *